(12) United States Patent
Dhanotiya et al.

(10) Patent No.: US 12,527,463 B2
(45) Date of Patent: Jan. 20, 2026

(54) ENDOSCOPE ELEVATOR ACTUATORS

(71) Applicants:Boston Scientific Scimed, Inc., Maple Grove, MN (US); Boston Scientific Medical Device Limited, Galway (IE)

(72) Inventors: Aditya Dhanotiya, Indore (IN); Shrikant Vasant Raut, Mumbai (IN); Balaji Aswatha Narayana, Bangalore (IN); James Weldon, Newton, MA (US); Nabarun Bhowmick, Kolkata (IN); Subodh Morey, Ponda (IN)

(73) Assignees: Boston Scientific Scimed, Inc., Maple Grove, MN (US); Boston Scientific Medical Device Limited, Galway (IE)

( * ) Notice: Subject to any disclaimer, the term of this patent is extended or adjusted under 35 U.S.C. 154(b) by 422 days.

(21) Appl. No.: 18/164,055

(22) Filed: Feb. 3, 2023

(65) Prior Publication Data
US 2023/0248224 A1 Aug. 10, 2023

Related U.S. Application Data

(60) Provisional application No. 63/307,381, filed on Feb. 7, 2022.

(51) Int. Cl.
*A61B 1/00* (2006.01)
*A61B 1/005* (2006.01)
*A61B 1/018* (2006.01)

(52) U.S. Cl.
CPC ........ *A61B 1/0052* (2013.01); *A61B 1/00098* (2013.01); *A61B 1/00128* (2013.01); *A61B 1/018* (2013.01)

(58) Field of Classification Search
CPC . A61B 1/018; A61B 1/00128; A61B 1/00098; A61B 1/0052; A61B 1/00066; A61M 25/0147; A61M 25/0136
See application file for complete search history.

(56) References Cited

U.S. PATENT DOCUMENTS

| 4,178,920 A | 12/1979 | Cawood, Jr. et al. |
| 8,033,993 B2 | 10/2011 | Amano et al. |

(Continued)

FOREIGN PATENT DOCUMENTS

| EP | 3689221 A1 | 8/2020 |
| WO | 2017011535 A1 | 1/2017 |

(Continued)

OTHER PUBLICATIONS

Cappell, M. S., "Colonoscopist's thumb: DeQuervains's syndrome (tenosynovitis of the left thumb) associated with overuse during endoscopy," Gastrointestinal Endoscopy, vol. 64, pp. 841-843 (2006).

*Primary Examiner* — Timothy J Neal
(74) *Attorney, Agent, or Firm* — Bookoff McAndrews PLLC

(57) ABSTRACT

A medical device comprising, a handle body, a flexible shaft coupled to a distal end of the handle body, a distal tip coupled to a distal end of the shaft and including a movable element, and an actuator coupled to the handle body and configured, upon actuation, to move the movable element, wherein the actuator includes a first contact element having outer contact surfaces each configured for contact by a finger of a user, each of the outer contact surfaces being at least one of angled and recessed relative to the other outer contact surfaces to provide a plurality of positions of contact between the finger and the actuator.

18 Claims, 14 Drawing Sheets

(56) References Cited

U.S. PATENT DOCUMENTS

| | | | |
|---|---|---|---|
| 8,092,373 B1 | 1/2012 | Papouras et al. | |
| 10,136,798 B2 | 11/2018 | Yamaya | |
| 2012/0165605 A1* | 6/2012 | Yamazaki | A61B 1/00066 600/106 |
| 2014/0316202 A1* | 10/2014 | Carroux | A61B 1/00085 600/146 |
| 2016/0242629 A1* | 8/2016 | Hijihara | A61B 1/05 |
| 2017/0086651 A1* | 3/2017 | Sato | G02B 23/2476 |
| 2018/0133438 A1* | 5/2018 | Hulvershorn | A61M 25/0606 |
| 2019/0053690 A1* | 2/2019 | Suzuki | A61B 1/0052 |
| 2019/0099063 A1* | 4/2019 | Ono | A61B 1/00071 |
| 2020/0214544 A1* | 7/2020 | Harada | A61B 1/018 |
| 2020/0229684 A1* | 7/2020 | Lund | A61B 1/0052 |
| 2020/0288944 A1* | 9/2020 | Aswatha Narayana | G05G 1/01 |
| 2021/0212553 A1* | 7/2021 | Appling | A61B 1/00042 |
| 2021/0315445 A1* | 10/2021 | Wilder | A61B 1/0058 |
| 2022/0079417 A1* | 3/2022 | Rask | A61B 1/00048 |
| 2023/0018783 A1* | 1/2023 | Kawanishi | A61B 1/00042 |

FOREIGN PATENT DOCUMENTS

| | | | |
|---|---|---|---|
| WO | 2021026231 A1 | 2/2021 | |
| WO | 2021213600 A1 | 10/2021 | |

\* cited by examiner

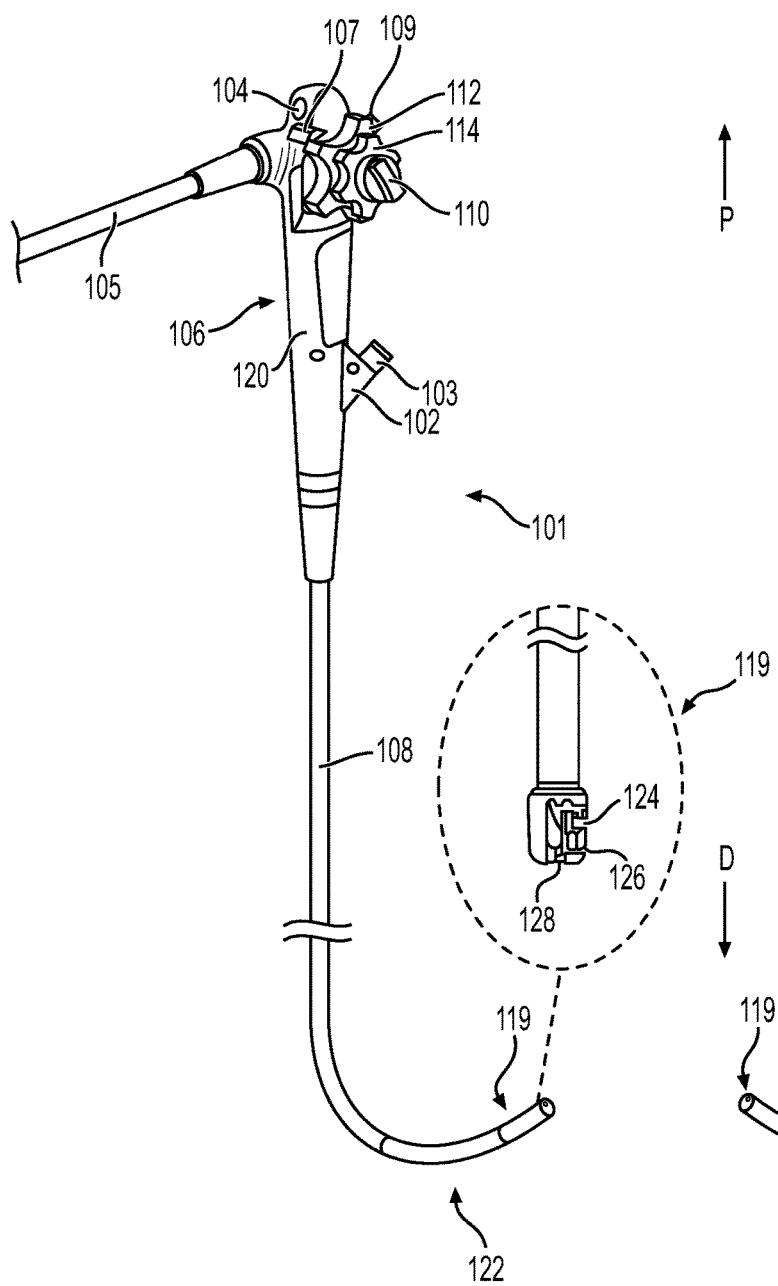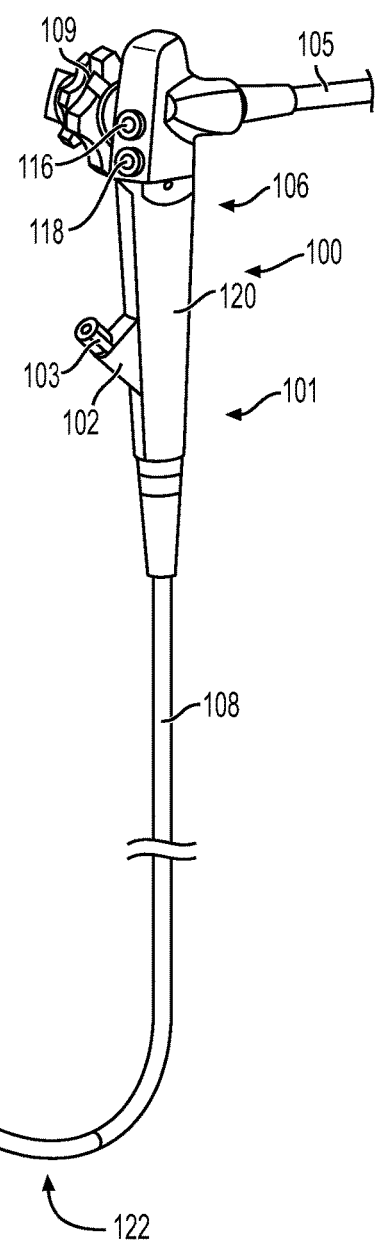
FIG. 1A  FIG. 1B

ENDOSCOPE ELEVATOR ACTUATORS

CROSS-REFERENCE TO RELATED APPLICATIONS

This application claims the benefit of priority under 35 U.S.C. § 119 from U.S. Provisional Application No. 63/307,381, filed Feb. 7, 2022, which is incorporated by reference herein in its entirety.

TECHNICAL FIELD

This disclosure relates generally to elevator actuators of medical devices. More specifically, embodiments of this disclosure relate to elevator actuator types for an endoscope or other medical device, among other aspects.

BACKGROUND

During cannulation of a common bile duct during an Endoscopic Retrograde Cholangiopancreatography (ERCP) procedure, medical professionals use a thumb to operate an elevator actuator of an endoscope to facilitate access of a guidewire, for example, to the desired duct. During cannulation, medical professionals operate the elevator actuator by moving the elevator actuator up or down with a thumb to articulate a distal tip (the elevator) of the endoscope. Once a desired angle position of the elevator of the endoscope relative to the papilla is established, medical professionals must then hold the elevator actuator in place to maintain the desired angle position.

Cannulation of the common bile duct with current elevator actuators presents technical challenges to even the most experienced medical professionals. For example, medical professionals with smaller hands may have difficulty reaching the elevator actuator, while simultaneously holding the grip of the endoscope handle, for example. Furthermore, difficulty in reaching the elevator actuator may result in inefficient manipulation of the elevator actuator. This may increase the time it takes for medical professionals to establish a desired angle position of the elevator of the endoscope and increase the overall ERCP procedure time. Repetitive thumb movements during ERCP procedures may contribute to musculoskeletal injuries. In addition, in tortuous positions typical of endoscope procedures, the wire mechanism inside the endoscope, for transferring the actuation force from the actuator to the elevator, may become rigid and additional effort may be required to move the elevator actuator. Endoscopes and other medical devices with elevator actuators that improve ergonomics may help address one or more of these or other issues.

SUMMARY OF THE DISCLOSURE

According to an example, a medical device may comprise a handle body, a flexible shaft coupled to a distal end of the handle body, a distal tip coupled to a distal end of the shaft and may include a movable element, and an actuator coupled to the handle body and configured, upon actuation, to move the movable element, wherein the actuator may include a first contact element having outer contact surfaces each configured for contact by a finger of a user, each of the outer contact surfaces being at least one of angled and recessed relative to the other outer contact surfaces to provide a plurality of positions of contact between the finger and the actuator.

In another example, each outer contact surface may include linear protrusions extending transverse to a proximal to distal axis of the medical device. The outer contact surfaces may include a center contact surface, a proximal contact surface proximal to the center contact surface, and a distal contact surface distal to the center contact surface, wherein the center contact surface protrudes radially outward relative to the proximal contact surface and the distal contact surface. The proximal contact surface may be angled relative to the center contact surface and inwards towards the handle body, the distal contact surface may be angled relative to the center contact surface and inwards towards the handle body, ends of proximal contact surface may be recessed and angled relative to corresponding ends of the center contact surface, and ends of the distal contact surface may be recessed and angled relative to the corresponding ends of the center contact surface. A first end of the center contact surface may overhang the proximal contact surface to define a first gap between the center contact surface and the proximal contact surface, and a second end of the center contact surface overhangs the bottom contact surface to define a second gap between the center contact surface and the distal contact surface. The actuator may further include a connector having a first end coupled to a radially inner surface of the first contact element of the actuator and a second end coupled to a ring. The ring may couple the actuator to the handle body and defines a central aperture that surrounds structure of the medical device for articulating a distal end of the medical device. The ring may rotate about the structure for articulating the distal end of the medical device. The actuator may include a second connector having a first end coupled to a radially inner surface of a second contact element of the actuator and a second end coupled to the ring at a position on the ring opposite to a position that the first connector is coupled to the ring. The first contact element and the second contact element may be positioned relative to the handle body so that a user contacting the first contact element with a thumb of a hand may contact the second contacting element with another finger of the hand. One of pushing up and pushing down on the first contact element while simultaneously the other of pushing up and pushing down on the second contact element may rotate the actuator about the handle body. The second contact element may include a proximal portion and a distal portion, wherein the proximal portion may protrude radially outward relative to the distal portion. Each of the proximal portion and the distal portion of the second contact element may include a radially outer contact surface that may be convex, and each of the proximal contact surface, the distal contact surface, and the center contact surface of the first contact element may be convex. Each of the proximal contact surface and the distal contact surface of the first contact element may be concave. The movable element may be an elevator configured to pivot about a portion of the distal tip and deliver a tool out of the distal tip at a plurality of angles relative to the distal tip.

According to an example, a medical device may comprise a handle body, a flexible shaft coupled to a distal end of the handle body, a distal tip coupled to a distal end of the shaft and may include an elevator configured to pivot about a portion of the distal tip and deliver a tool out of the distal tip at a plurality of angles relative to the distal tip, and an actuator coupled to the handle body and configured, upon actuation, to pivot the elevator, wherein the actuator extends radially outward from the handle body and may comprise a contact element extending longitudinally in the proximal-to-distal direction, wherein the contact element may include a proximal contact surface, a distal contact surface, and a central contact surface between the proximal and distal contact surfaces and protruding radially outward relative to the proximal and distal contact surfaces, a connector having a first end coupled to an inner surface of the contact element and a second end coupled to a ring, the ring having an aperture surrounding structure for articulating a distal end of the flexible shaft. Each of the proximal contact surface, the distal contact surface, and the central contact surface may include linear protrusions extending transverse to a proximal to distal axis of the medical device. The actuator may include a second connector having a first end coupled to an inner surface of a second contact element and a second end coupled to the ring opposite to a position that the first connector is coupled to the ring.

According to an example, a medical device may comprise a handle body, a flexible shaft coupled to a distal end of the handle body, a distal tip coupled to a distal end of the shaft and may include an elevator configured to pivot about a portion of the distal tip and deliver a tool out of the distal tip at a plurality of angles relative to the distal tip, and an actuator coupled to the handle body and configured, upon actuation, to pivot the elevator, wherein the actuator extends radially outward from the handle body and may comprise a center portion that is relatively planar, a top ridge angled and recessed relative to the center portion, and a bottom ridge angled and recessed relative to the center portion. The center portion may include a center contact surface, the top ridge may include a proximal contact surface, and the bottom ridge may include a distal contact surface, wherein the proximal contact surface may be angled relative to the center contact surface and inwards towards the handle body, the distal contact surface may be angled relative to the center contact surface and inwards towards the handle body, ends of proximal contact surface may be recessed and angled relative to corresponding ends of the center contact surface, and ends of the distal contact surface may be recessed and angled relative to the corresponding ends of the center contact surface.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 1A and 1B are perspective views of an exemplary endoscope, according to aspects of this disclosure.

DETAILED DESCRIPTION

Figure 2A:
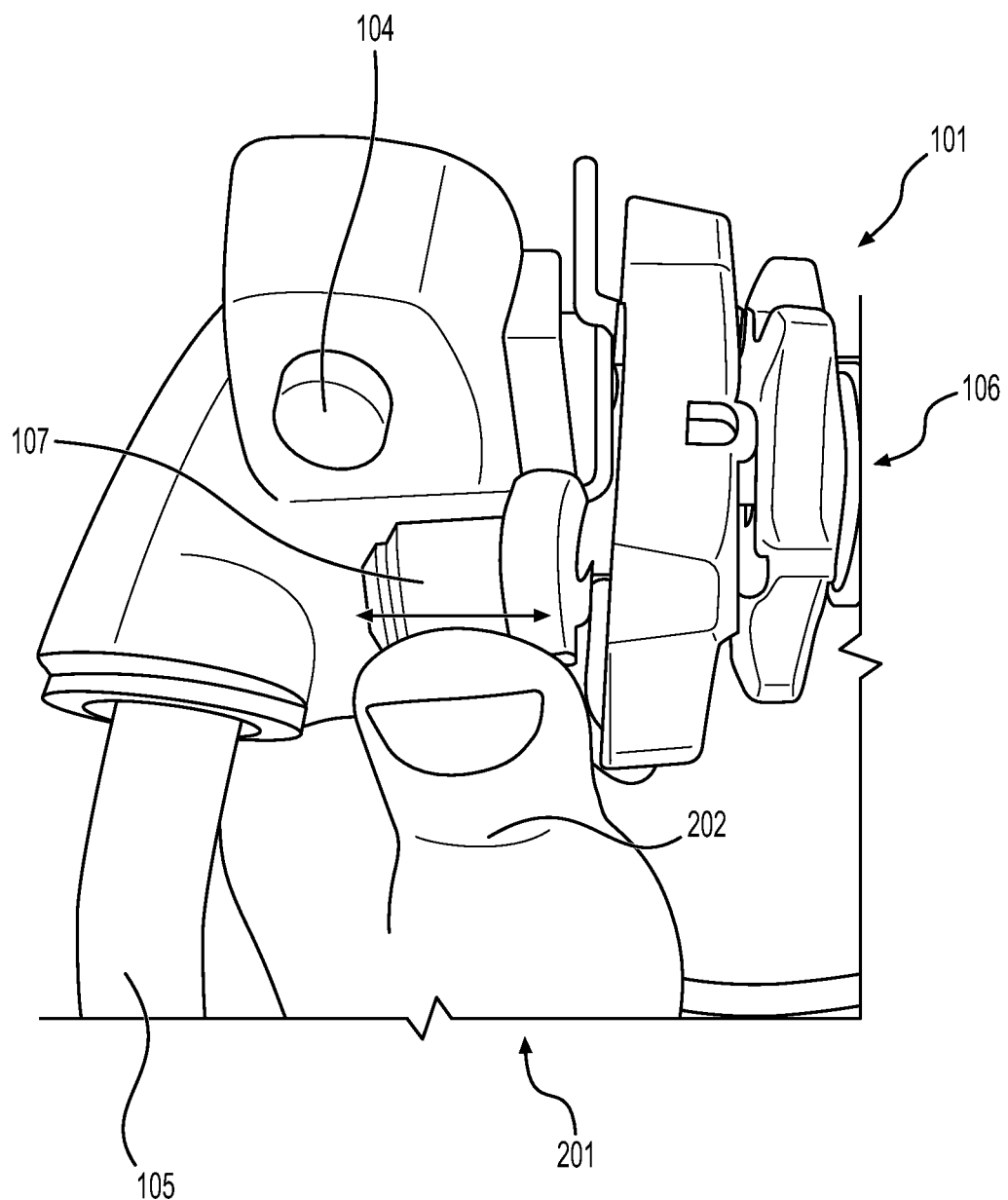
FIGS. 2A and 2B are perspective views of a user's hand holding an exemplary endoscope, according to aspects of this disclosure.

Reference will now be made in detail to aspects of this disclosure, examples of which are illustrated in the accompanying drawings. Wherever possible, the same or similar reference numbers will be used through the drawings to refer to the same or like parts. The term "distal" refers to a portion farthest away from a user when introducing a device into a patient. By contrast, the term "proximal" refers to a portion closest to the user when placing the device into the patient. Throughout the figures included in this application, arrows labeled "P" and "D" are used to show the proximal and distal directions in the figure. As used herein, the terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal." Further, relative terms such as, for example, "about," "substantially," "approximately," etc., are used to indicate a possible variation of ±10% in a stated numeric value or range.

FIGS. 1A and 1B show perspective views of an exemplary endoscope 101. Endoscope 101 may include a handle assembly 106 and a flexible tubular shaft 108. The handle assembly 106 may include a biopsy port 102, a biopsy cap 103, an image capture button 104, an elevator actuator 107, a first locking lever 109, a second locking lever 110, a first control knob 112, a second control knob 114, a suction button 116, an air/water button 118, a handle body 120, and an umbilicus 105. Any of the actuators, elevators, knobs, levers, ports, or caps of endoscope 101 may serve any purpose and are not limited by any particular use that may be implied by the respective naming of each component used herein. Umbilicus 105 may extend from handle body 120 to auxiliary devices, such as a control unit, water supply, or vacuum source. Umbilicus 105 therefore can transmit signals between endoscope 101 and the control unit, to control lighting and imaging components of endoscope 101 and/or receive image data from endoscope 101. Umbilicus 105 also can provide fluid for irrigation from the water supply and/or suction to a distal tip 119 of shaft 108. Buttons 116 and 118 control valves for suction and fluid supply, respectively.

Shaft 108 may include an articulation section 122 for deflecting distal tip 119 in up, down, left, and/or right directions. Knobs 112 and 114 may be used for controlling such deflection, and locking levers 109 and 110 may lock knobs 112 and 114, respectively, in desired positions. Handle body 120 may be tapered and may narrow as the handle assembly 106 extends distally such that the profile of the handle body 120 is smaller at its distal end than at its proximal end.

Distal tip 119 may include an imaging device 124 (e.g., a camera) and a lighting source 126 (e.g., an LED or an optical fiber). Distal tip 119 may be side-facing. That is, imaging device 124 and lighting source 126 may face radially outward, perpendicularly, approximately perpendicularly, or otherwise transverse to a longitudinal axis of shaft 108 and distal tip 119.

Distal tip 119 may also include an elevator 128 for changing an orientation of a tool inserted in a working channel of endoscope 101. Elevator 128 may alternatively be referred to as a swing stand, pivot stand, raising base, or any suitable other term. Elevator 128 may be pivotable via, e.g., an actuation wire or another control element that extends from elevator actuator 107 on handle assembly 106, through shaft 108 to elevator 128.

Although the term endoscope may be used herein, it will be appreciated that other devices, including, but not limited to, duodenoscopes, colonoscopes, ureteroscopes, bronchoscopes, laparoscopes, sheaths, catheters, or any other suitable delivery device or medical device may be used in connection with the devices of this disclosure.

Embodiments of this disclosure improve elevator actuator ergonomics and usability and as non-limiting exemplary benefits, help reduce strain on medical professionals' thumbs, improve control of the distal tip of an endoscope, and increase endoscope adaptability among medical professionals with different hand sizes, among other aspects. In various embodiments, the elevator actuator pivots, or rotates, about a portion of the handle body. The elevator actuator includes a plurality of radially outermost surfaces that a user can individually or simultaneously contact, via a thumb for example, to apply force to the actuator. These radially outermost surfaces are discrete from each other, and may be angled and/or recessed relative to each other, for example.

Figure 2B:
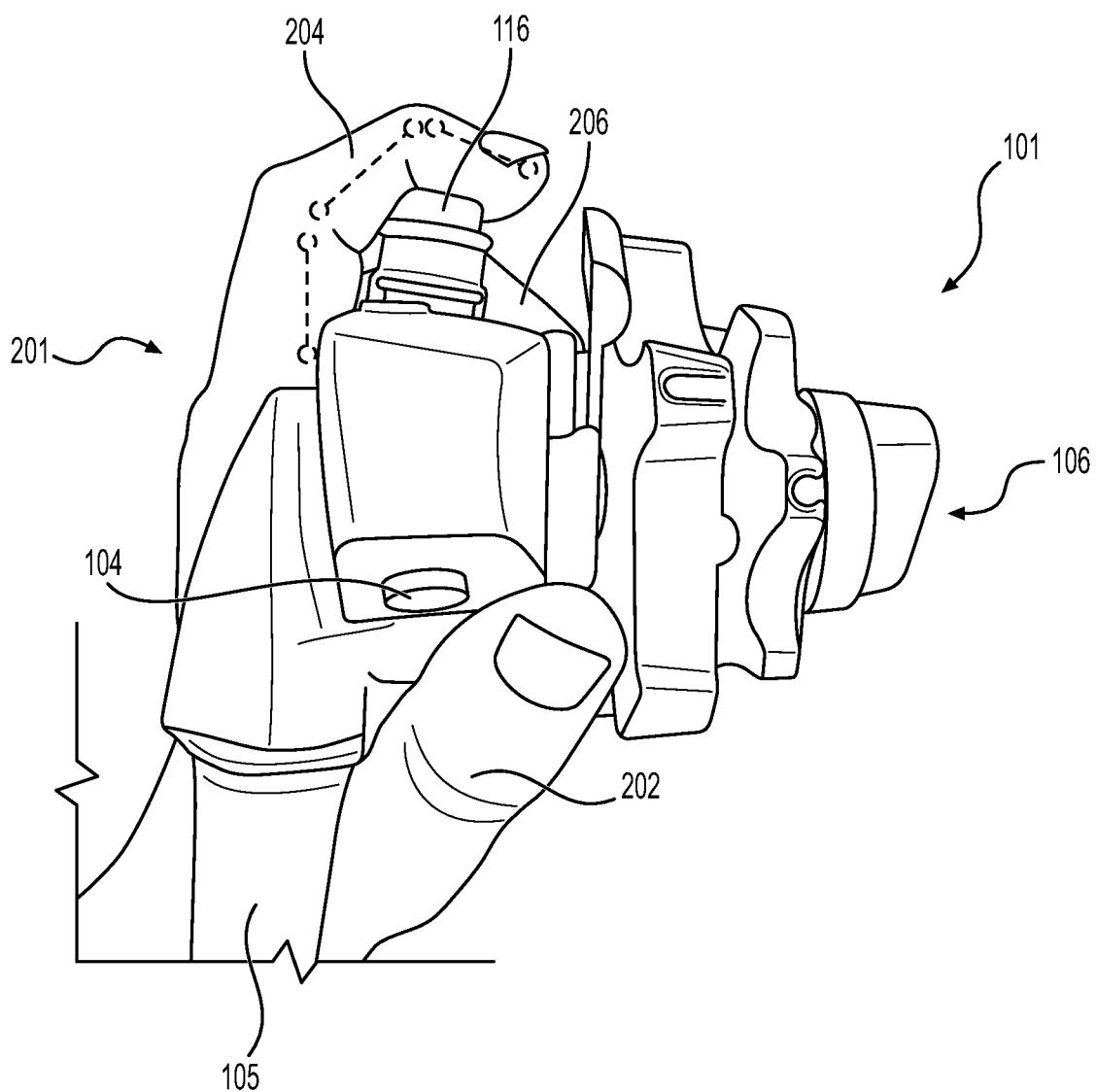

FIGS. 2A and 2B show perspective views of an exemplary user's left hand 201 grasping handle assembly 106 of endoscope 101. In a first position of user's left hand 201 (shown in FIG. 2A), user's thumb 202 is positioned below a typical elevator actuator 107. A space exists between user's thumb 202 and umbilicus 105. User's thumb 202 may be used to operate elevator actuator 107 and image capture button 104. In a second position of user's left hand 201 (shown in FIG. 2B), user's thumb 202 is covering elevator actuator 107. In the second position, user's thumb 202 may contact umbilicus 105. User's index finger 204 may contact/ and or be used to operate the suction button 116. User's middle finger 206 may contact/and or be used to operate air/water button 118. As shown in FIGS. 2A and 2B, the length of elevator actuator 107 may not be long enough to be accessed from any given grasping position of handle assembly 106 by user's left hand 201. For example, thumb 202 of a user with a small left hand 201 may have difficulties accessing elevator actuator 107 when operating suction button 116 with index finger 204 and/or operating air/water button 118 with middle finger 206. As another example, a user with a large left hand 201 may not get proper support of umbilicus 105 during operation of elevator actuator 107.

Figure 3A:
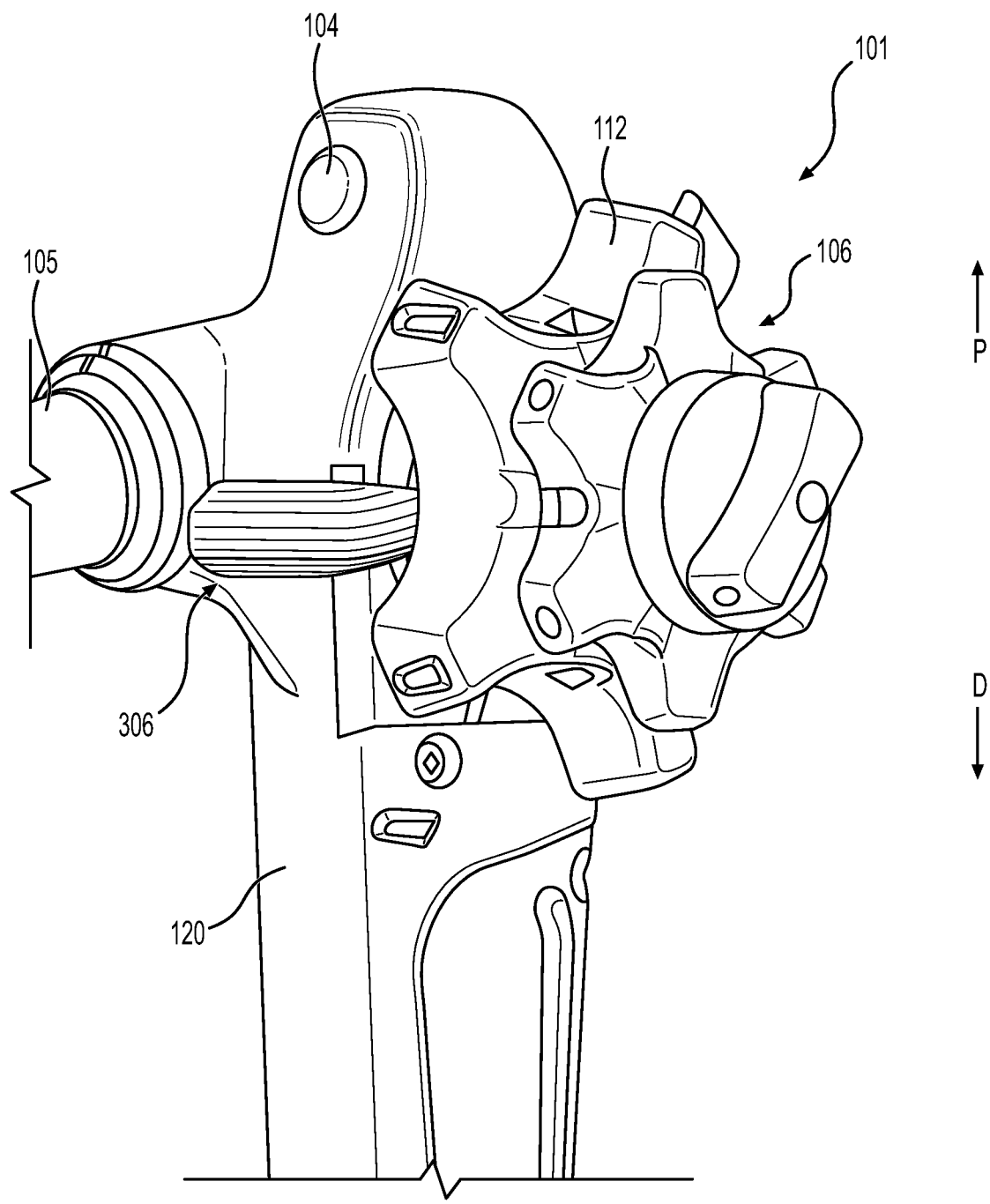
FIGS. 3A-3C are perspective views of an exemplary elevator actuator, according to aspects of this disclosure.
Figure 3B:
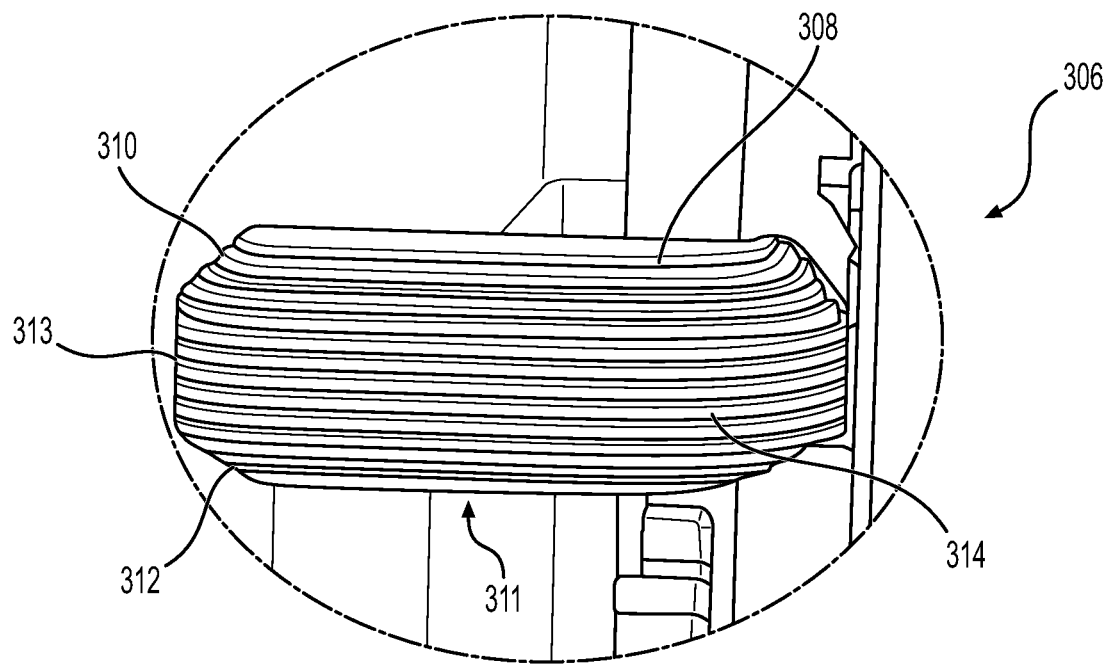
Figure 3C:
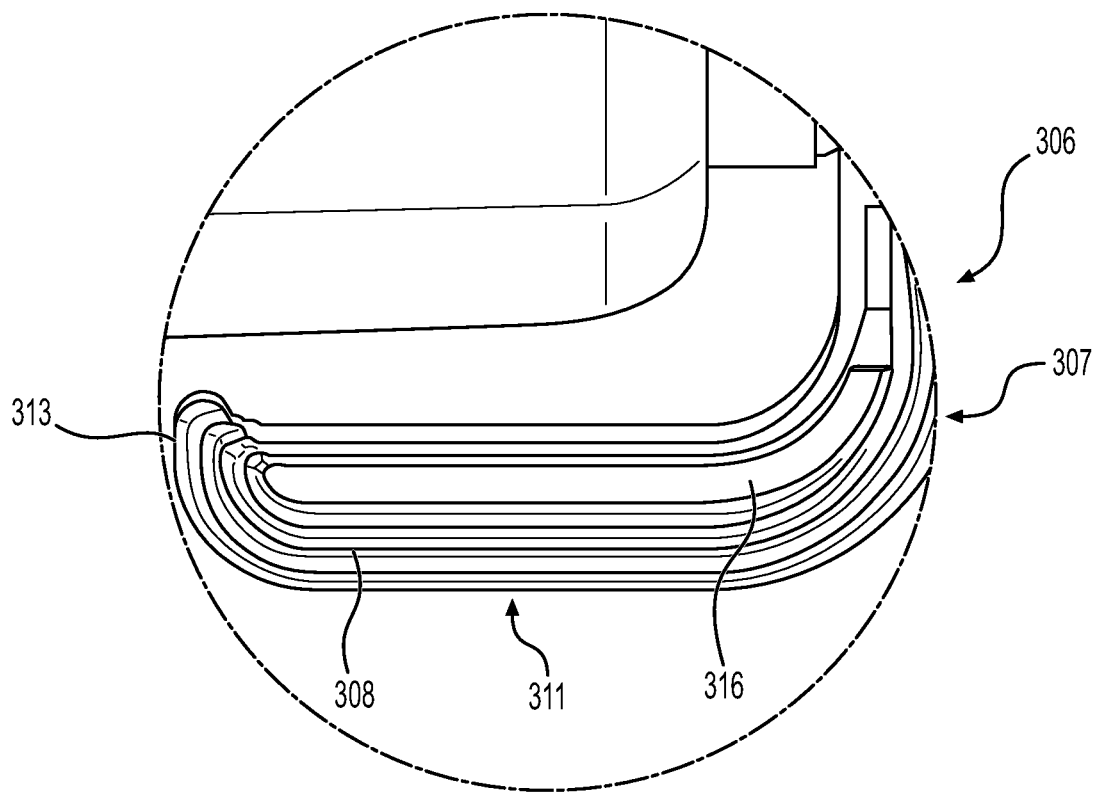

FIGS. 3A-3C show perspective views of an exemplary long, centrally accessible elevator actuator 306. Elevator actuator 306 may include an extension portion 307 that extends radially outward from underneath first control knob 112, then curves around the outer surface of handle body 120 to lead into a lateral extension portion 311. Lateral extension portion 311 may extend laterally with minimal space between its terminal, free end 313 and umbilicus 105. Lateral extension portion 311, due to its additional length compared to typical elevator actuators, may allow for easier user thumb 202 accessibility to elevator actuator 306 even when user is operating suction button 116 with index finger 204 and/or air/water button 118 with middle finger 206. Elevator actuator 306 may extend beyond the outside surface of handle body 120 forming a gap between an inside face of the elevator actuator 306 and the outside surface of handle body 120. In some examples, elevator actuator 306 may be made of plastic and/or rubber materials, or any other suitable material. Elevator actuator 306 may include grip lines 308 on its outer surface. Each grip line 308 may be a thin linear protrusion extending outward from adjacent portions of the outer surface having grip line 308. Each grip line 308 may extend from side-to-side, transverse, or substantially perpendicular, to the proximal/distal directions. Grip lines 308 may increase the friction between gloves on a user's hand and elevator actuator 306. Grip lines 308 may reduce any pinching and/or poking effect on surface area of user's thumb 202, as compared to elevator actuators that include sharp ribs on its outer surface.

Elevator actuator 306 may include a central area 314 that is relatively flat/planar (except for the grip lines 308), a top ridge 310, and a bottom ridge 312. The outward-facing surface of top ridge 310 may be angled inwards towards handle body 120, relative to the outward-facing surface of central area 314. Both ends of top ridge 310 (the free end and the end closest to knob 112) may be recessed and angled relative to the corresponding ends (including free end 313) of central area 314. The outward-facing surface of bottom ridge 312 may be angled inwards towards handle body 120, relative to the outward-facing surface of central area 314. Both ends of bottom ridge 312 (the free end and the end closest to knob 112) may be recessed and angled relative to the corresponding ends (including free end 313) of central area 314. Each of central area 314, top ridge 310, and bottom ridge 312 may include grip lines 308. A user may move elevator actuator 306 up by pushing the bottom ridge 312 of elevator actuator upwards with a tip area or distal interphalangeal (DIP) joint of thumb 202. A user may move elevator actuator 306 down by pushing the top ridge 310 of elevator actuator 306 downwards with a tip area or DIP joint of thumb 202. In another example, a user may move elevator actuator 306 up or down by pushing against the central flat area 314 of elevator actuator 306 upwards or downwards with a tip area or DIP joint of thumb 202. A top surface 316 of elevator actuator 306 may be flat and have a smooth texture. The bottom surface (not shown) of elevator actuator 306 may be substantially similar to top surface 316. The use of "top" or "upper" and "bottom" or "lower," or like terms, as modifiers for structure in embodiments of this disclosure refers to the relative position of that structure when an endoscope is in a typical position during use, such as the positions shown in the Figures.

Figure 4A:
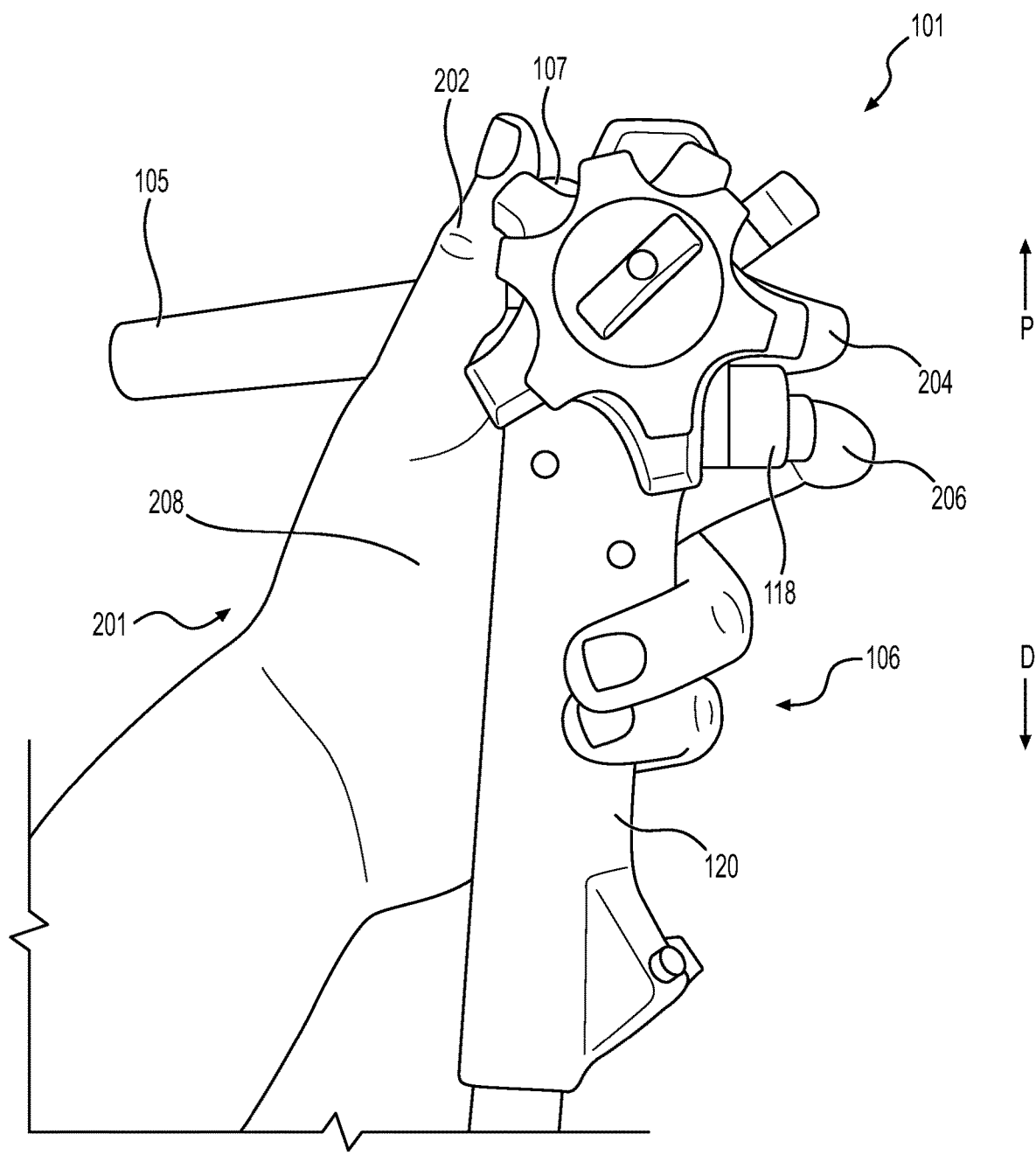
FIGS. 4A-4B are perspective views of a user's hand holding an exemplary endoscope, according to aspects of this disclosure.
Figure 4B:
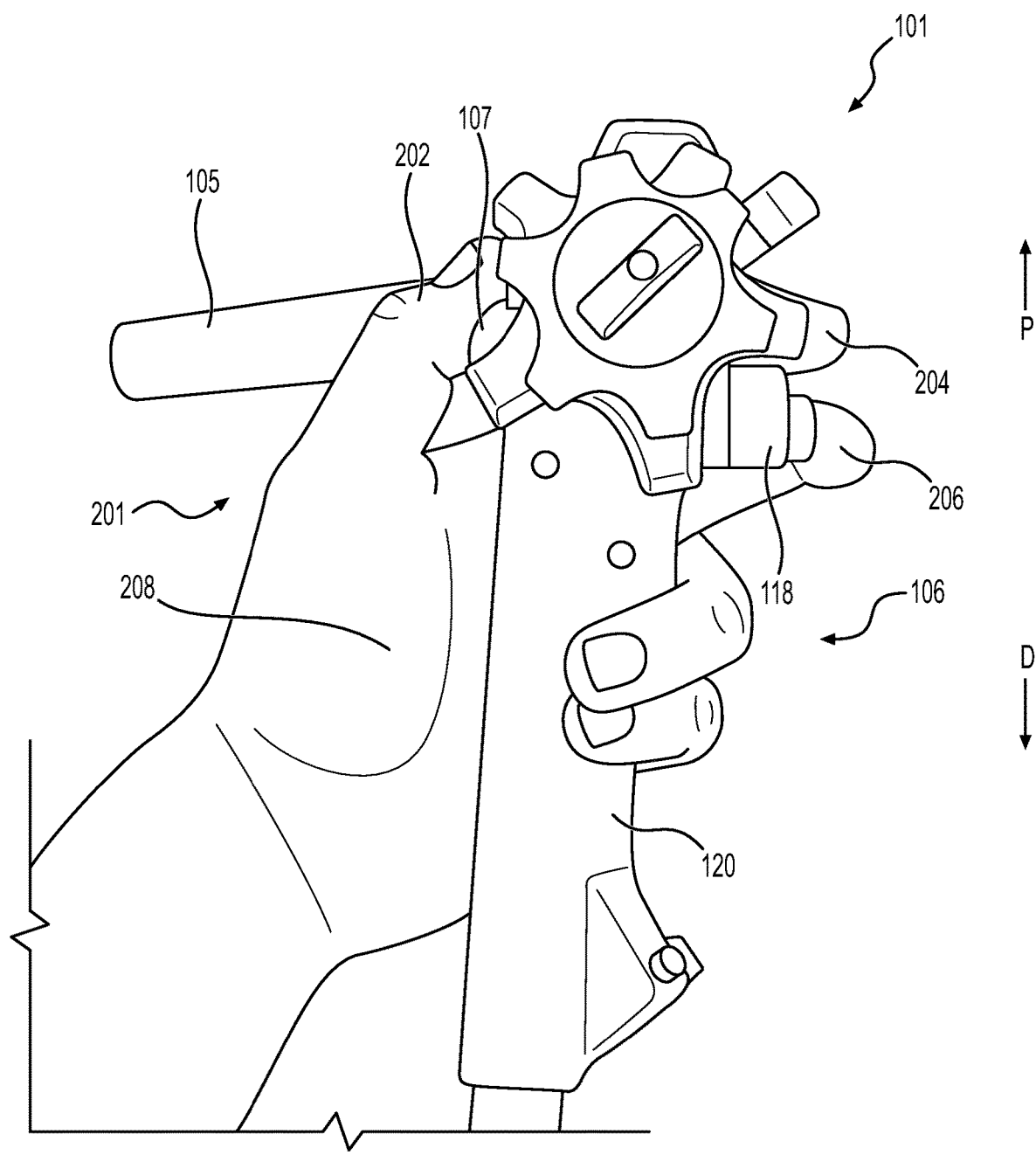

FIGS. 4A and 4B show perspective views of an exemplary user's left hand 201 grasping handle assembly 106 of endoscope 101. User's index finger 204 and middle finger 206 may be used to operate the suction button 116 and the air/water button 118. The user may position thumb 202 of the left hand 201 over elevator actuator 107 and move the elevator actuator 107 along a circular path from a first position (shown in FIG. 4A) to a second position (shown in FIG. 4B) by moving thumb 202 downward. As shown in FIG. 4B, user's palm 208 may move away from handle body 120 when thumb 202 moves from the first position to the second position. A space may be created between user's palm 208 and handle body 120. When user's palm 208 moves away from handle body 120, the user may lose umbilicus 105 support and gripping power on handle body 120.

Figure 5:
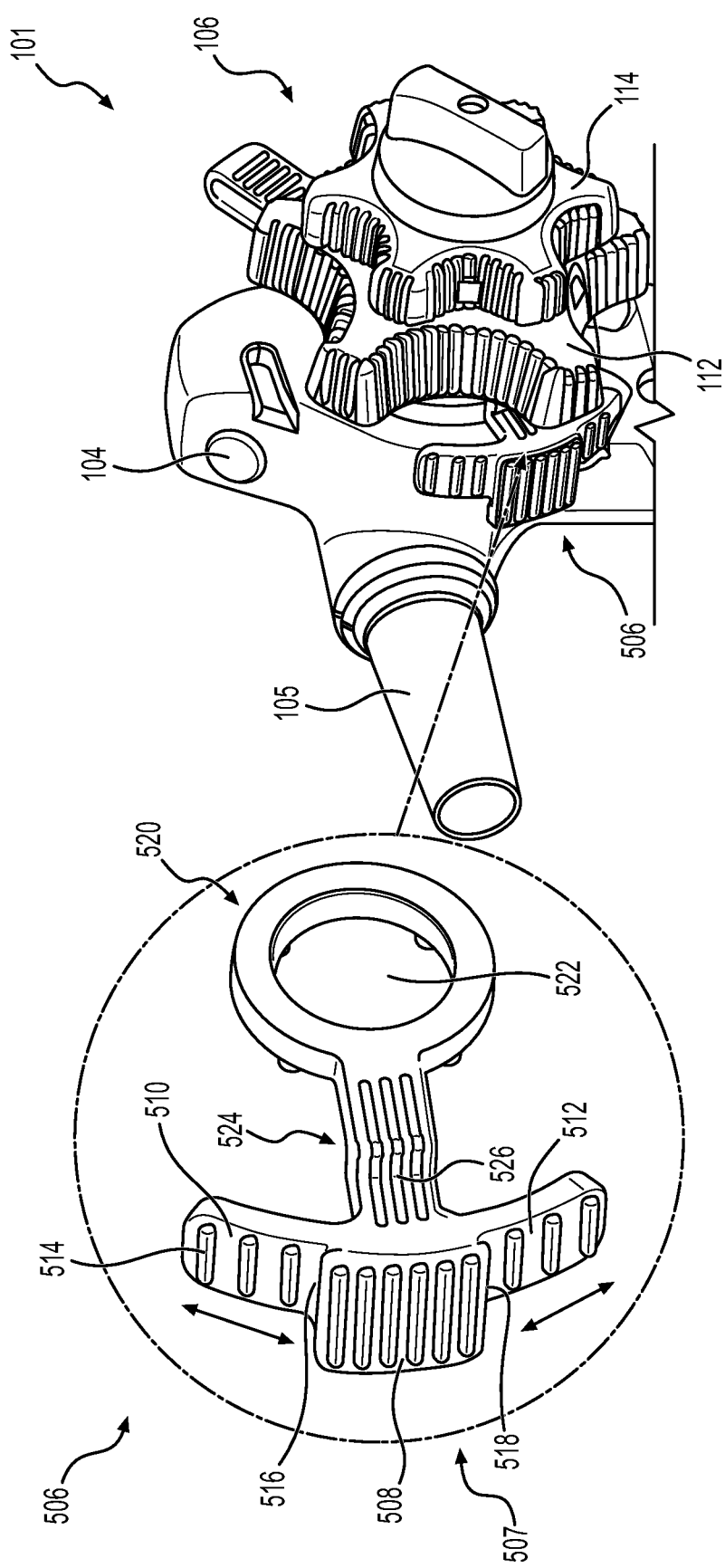
FIG. 5 is a perspective view of an exemplary elevator actuator, according to aspects of this disclosure.

FIG. 5 shows a perspective view of an exemplary extended elevator actuator 506 coupled to another portion of handle assembly 106 of endoscope 101, with an exploded view of elevator actuator 506 not coupled to a remainder of endoscope 101. Elevator actuator 506 may include contact arm 507 having a center body element 508, and a top extension element 510 and a bottom extension element 512 recessed from center body element 508. Center body element 508 protrudes outwardly, further from handle body 120, relative to elements 510 and 512. Contact arm 507 extends longitudinally in the up/down direction generally parallel to the longitudinal axis of handle body 120. In other words, contact arm 507 has a length in the proximal/distal direction that is larger than a width perpendicular to that direction. Contact arm 507 is curved so that it is convex towards a user of the endoscope. Top extension element 510 and bottom extension element 512 may extend in opposite directions from opposite sides of center body element 508. Center body element 508 may be wider than top extension element 510 and bottom extension element 512. A bottom end of center body element 508 may overhang an outer surface of bottom extension element 512 to form a recess/gap 518 between elements 508 and 512. Similarly, a top end of center body element 508 may overhang an outer surface of top extension element 514 to form a recess/gap 516. These recesses 516/518 may assist in a user's grip of contact arm 507. Outer surface of center body element 508, top extension element 510, and bottom extension element 512 may include grip projections 514. Each grip projection 514 protrudes from adjacent portions of the outer surface having the grip projection. Each grip projection 514 extends from side-to-side, transverse, or substantially perpendicular, to the proximal/distal directions. Grip projections 514 may improve gripping capabilities, for example, when a user has on wet gloves.

By positioning thumb 202 on top extension element 510 or bottom extension 512, and pressed against top or bottom ends of center body element 508 respectively, the user's thumb 202 can more easily access and operate elevator actuator 506 without loss of gripping power. By using top extension element 510 and bottom extension element 512, a tip of a user's thumb 202 may remain in a same position on elevator actuator 506 while moving elevator actuator 506 up or down via scrolling action. In another example, the user may position thumb 202 on center body element 508 and push against center body element 508 upwards or downwards with a tip area or DIP joint of thumb 202 to move elevator actuator 506 up or down.

Elevator actuator 506 may further include a connector 524 which couples contact arm 507 to a ring 520. One end of connector 524 couples to an inner surface contact of arm 507, and the other end of connector 524 couples to a radially outer surface of ring 520. Connector 524 may include a bend 526 that aligns with features on handle body 120.

Ring 520 may include an opening 522 that aligns with features of handle assembly 106 of endoscope 101. Bend 526 and opening 522 may allow for elevator actuator 506 assembly to be positioned between handle body 120 and control knob 112 of endoscope 101. Opening 522 accommodates structure connecting contact arm 507 and knobs 112 and 114 to structure internal to handle body 120, for controlling pivoting of the elevator and articulation of articulation section 122. Ring 520 opening 522 may lie in a plane that includes portions of contact arm 507.

FIGS. 6A-6D show perspective views of an exemplary extended elevator actuator 606 coupled to another portion of handle assembly 106 of endoscope 101, with an exploded view of actuator 606 not coupled to a remainder of endoscope 101. Elevator actuator 606 may include a first contact arm 607 coupled to a second contact arm 609 by a ring 620, a first connector 624, and a second connector 628.

Figure 6A:
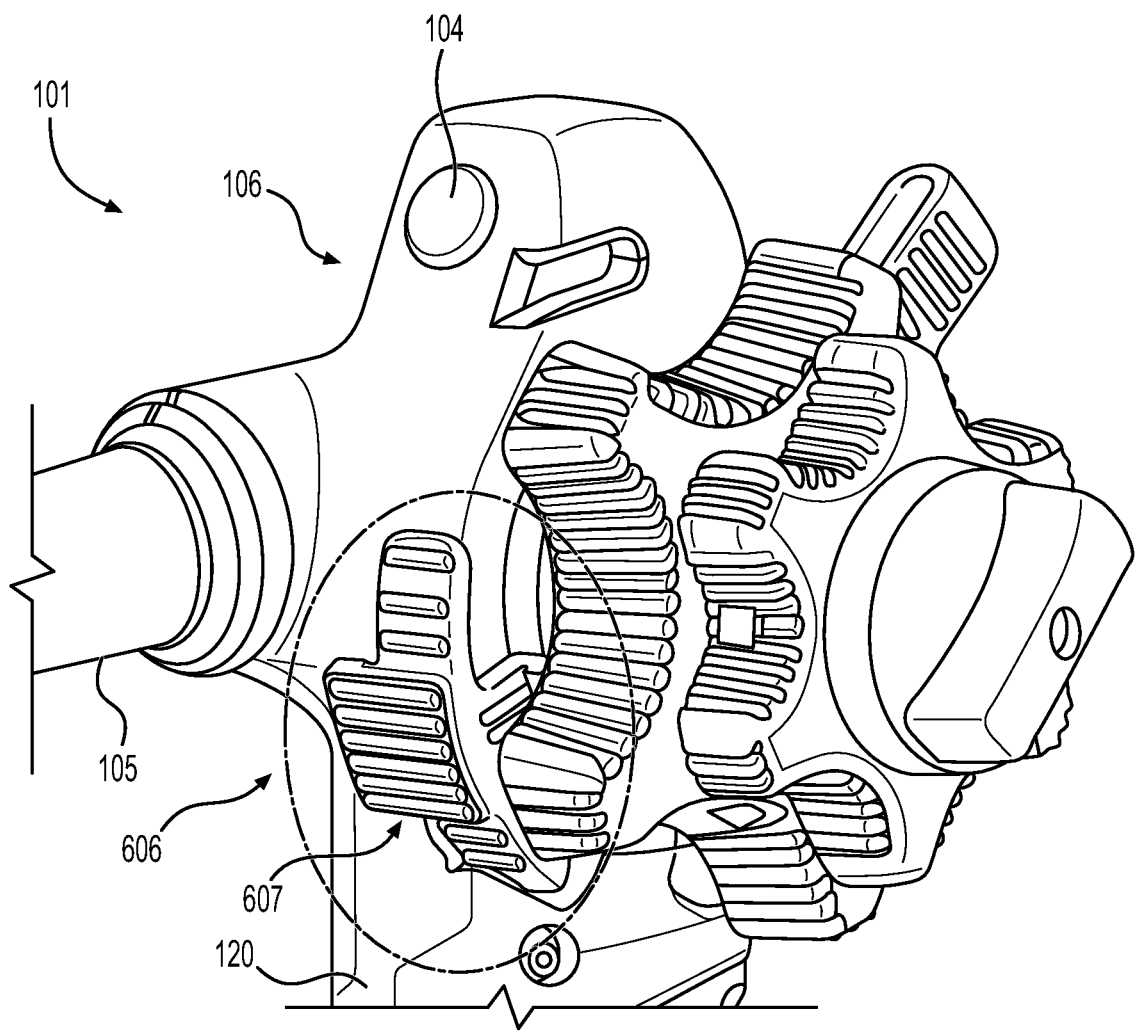
FIGS. 6A-6D are perspective views of an exemplary elevator actuator, according to aspects of this disclosure.
Figure 6B:
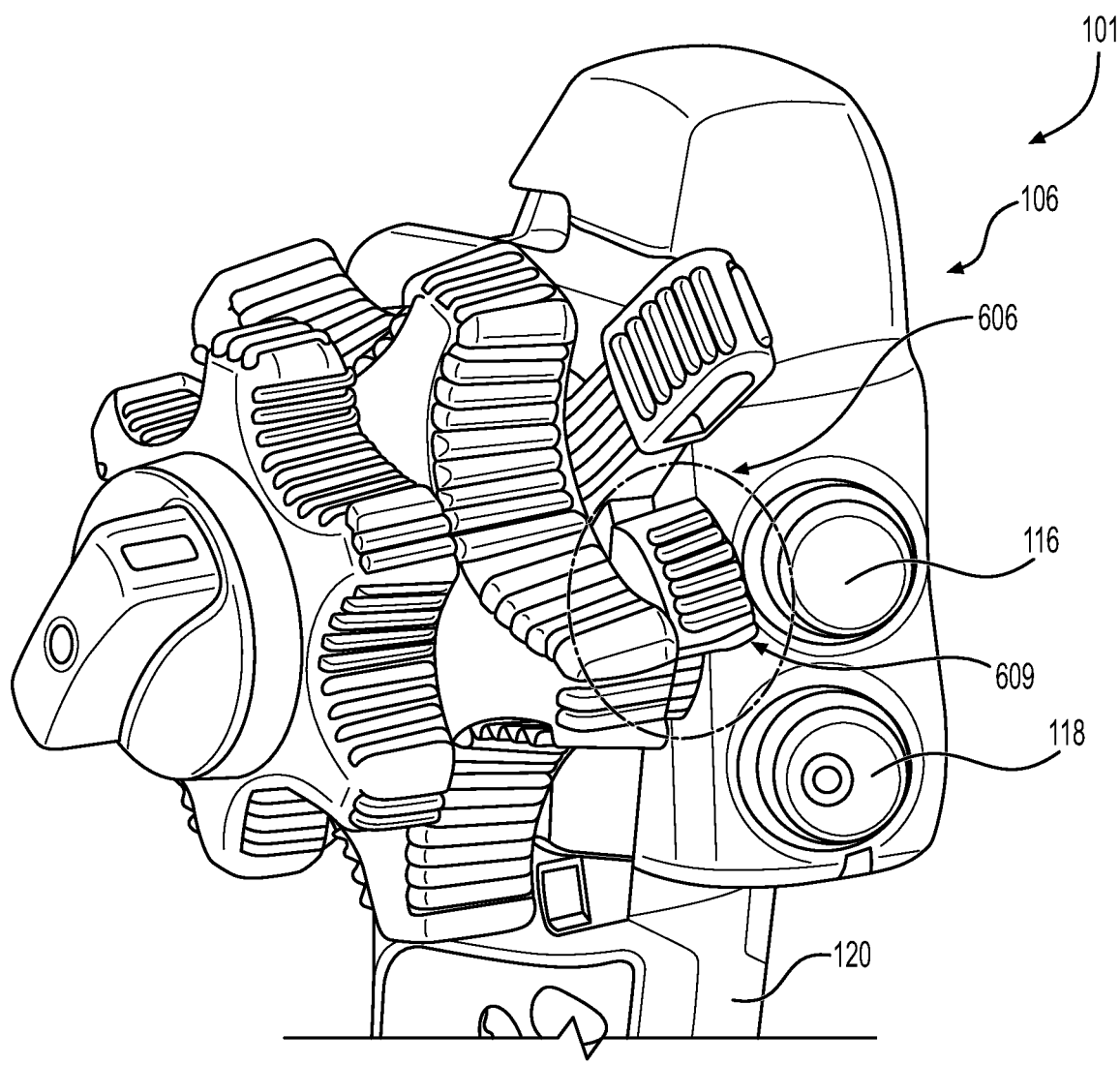
Figure 6C:
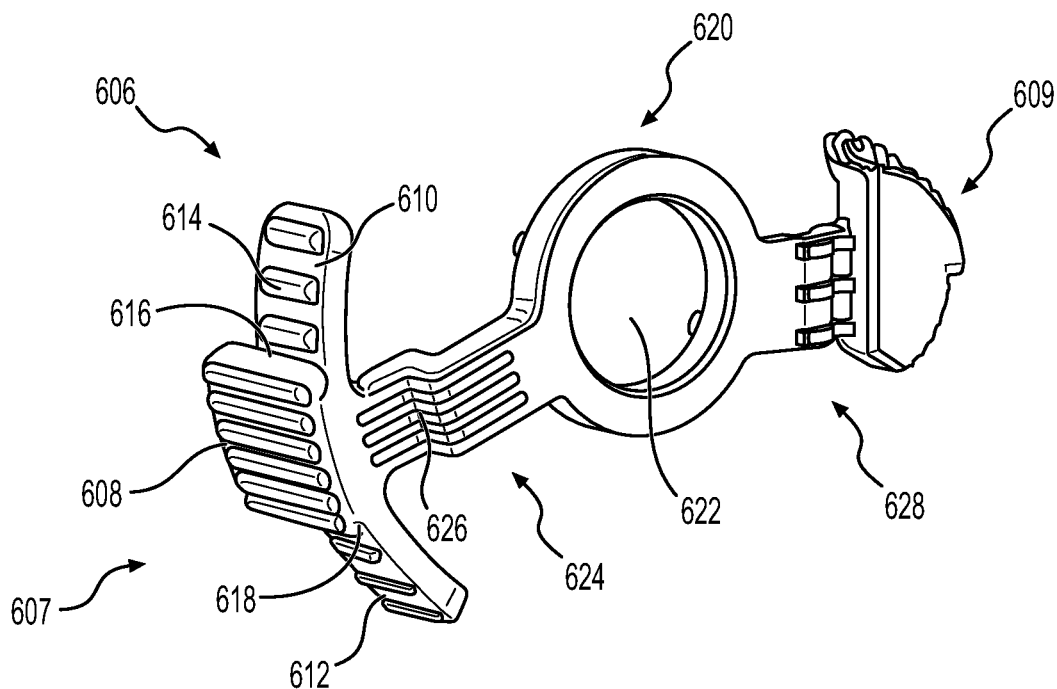
Figure 6D:
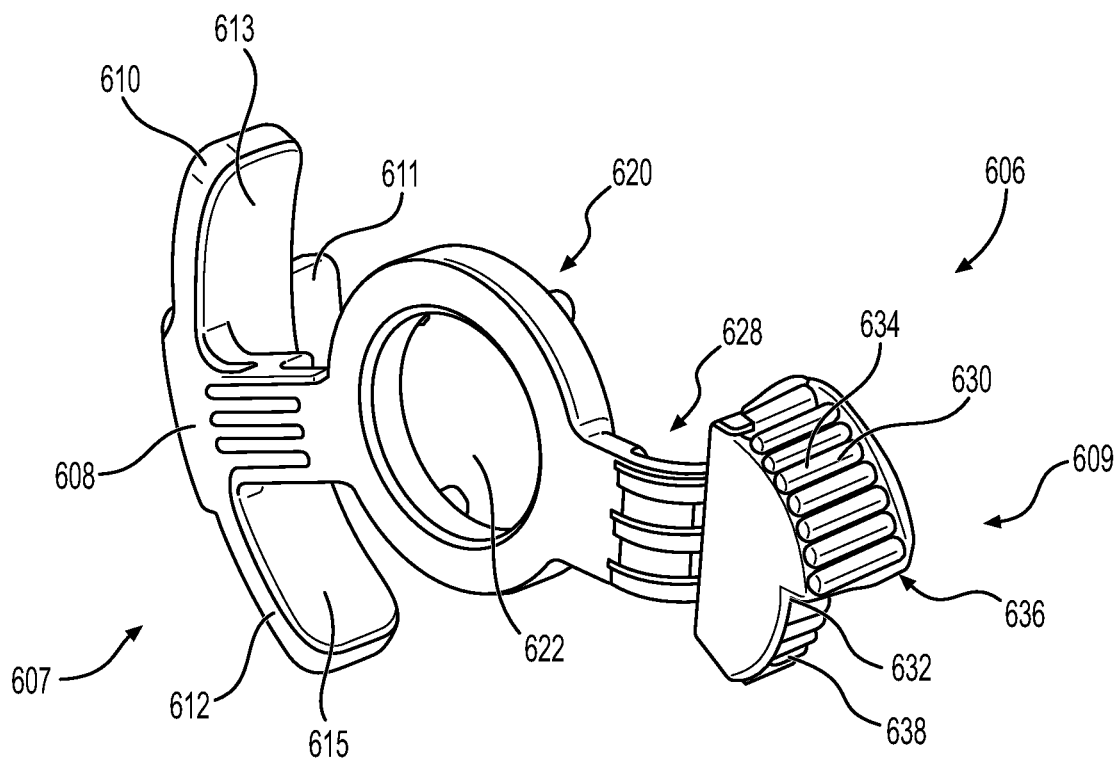

As shown in FIG. 6A, first contact arm 607 extends radially outward from handle body 120 and is curved so that it is convex towards a user of endoscope 101. As shown in FIG. 6B, second contact arm 609 extends radially outward from handle body 120 in the opposite direction of first contact arm 607 and faces away from a user of endoscope 101. Second contact arm 609 is positioned near suction button 116 and/or air/water button of handle assembly 106. In one example, first contact arm 607 and the second contact arm 609 may allow for elevator actuator 606 to be operated by user's thumb 202 and middle finger 206, respectively, to reduce the actuation effort on user's thumb 202 by distributing some of that effort to middle finger 206, and may reduce musculoskeletal injuries as discussed above.

Elements of elevator actuator 606 have the same or similar structure and function as like elements of elevator actuator 506. Specifically, first contact arm 607, a center body element 608, a top extension element 610, a bottom extension element 612, grip projections 614, a recess 616, a recess 618, ring 620, an opening 622, first connector 624, and a bend 626, are the same or similar to contact arm 507, center body element 508, top extension element 510, bottom extension element 512, grip projections 514, recess 516, recess 518, ring 520, opening 522, connector 524, and bend 526.

Second connector 628 may connect second contact arm 609 to ring 620 at a side of ring 620 opposite to a side that first contact arm 607 connects to ring 620. Second contact arm 609 may include a top portion 634 and a bottom portion 638 intersected by a dent 632. Dent 632 is a surface that faces downward and connects an outer contact surface of top portion 634 to an outer contact surface of bottom portion 638, in such a way that top portion 634 includes an overhang 636 that protrudes radially outward relative to bottom portion 632. Similar to first contact arm 607, top portion 634 and bottom portion 638 may include grip projections 630 on the outside, contact surface to improve gripping capabilities. Overhang 636 may be pushed against by user's middle finger 206 to move second contact arm 609 upwards. User's middle finger 206 may push down on top portion 634 to move second contact arm 609 downwards. In one example, user's middle finger 206 can be used to actuate elevator actuator 606 by moving second contact arm 609 up or down to reduce the load on user's thumb 202 operating first contact arm 607. In another example, first contact arm 607 and second contact arm 609 may be operated by user's thumb 202 and middle finger 206, respectively, simultaneously or individually.

Figure 7:
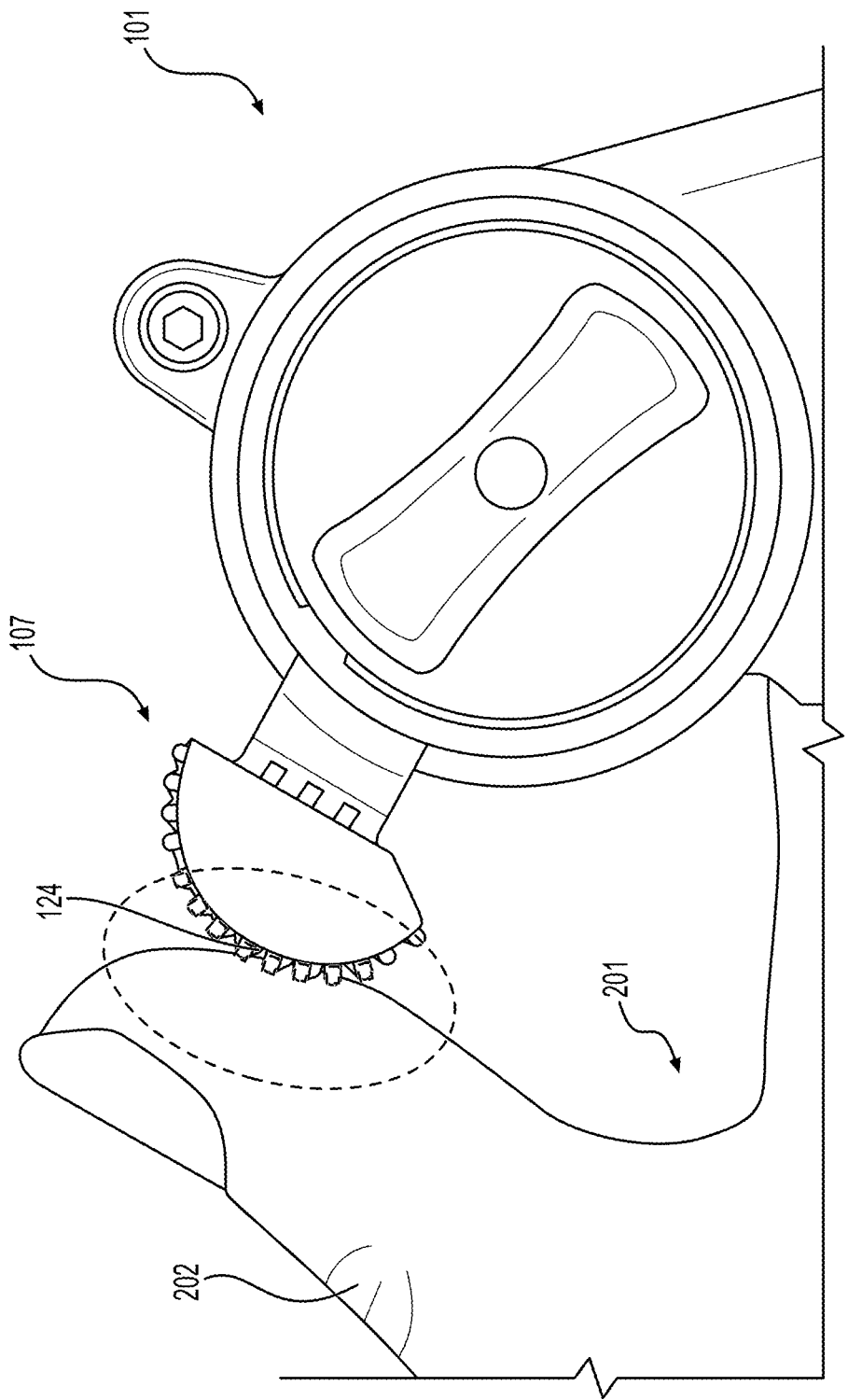
FIG. 7 is a perspective view of a user's hand holding an exemplary endoscope, according to aspects of this disclosure.

FIG. 7 shows thumb 202 on user's left hand 201 covering a typical elevator actuator 107 on endoscope 101. A typical elevator actuator 107 includes sharp ribs 124 on an outer convex surface, which may pinch the surface of user's thumb 202 and cause discomfort if held for a long period of time.

Figure 8A:
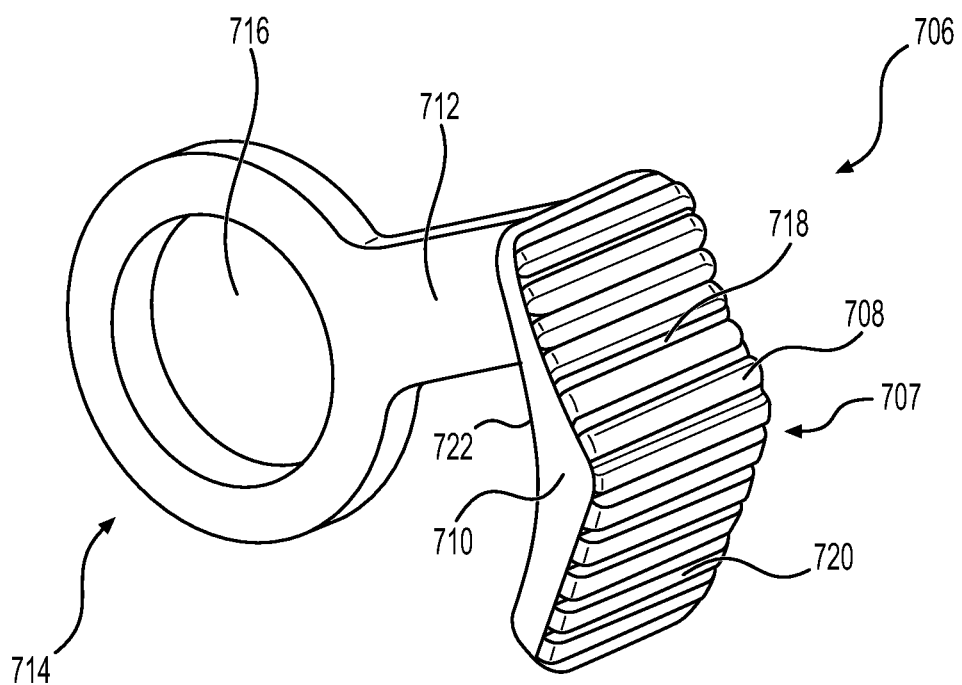
FIGS. 8A and 8B are perspective views of an exemplary elevator actuator, according to aspects of this disclosure.
Figure 8B:
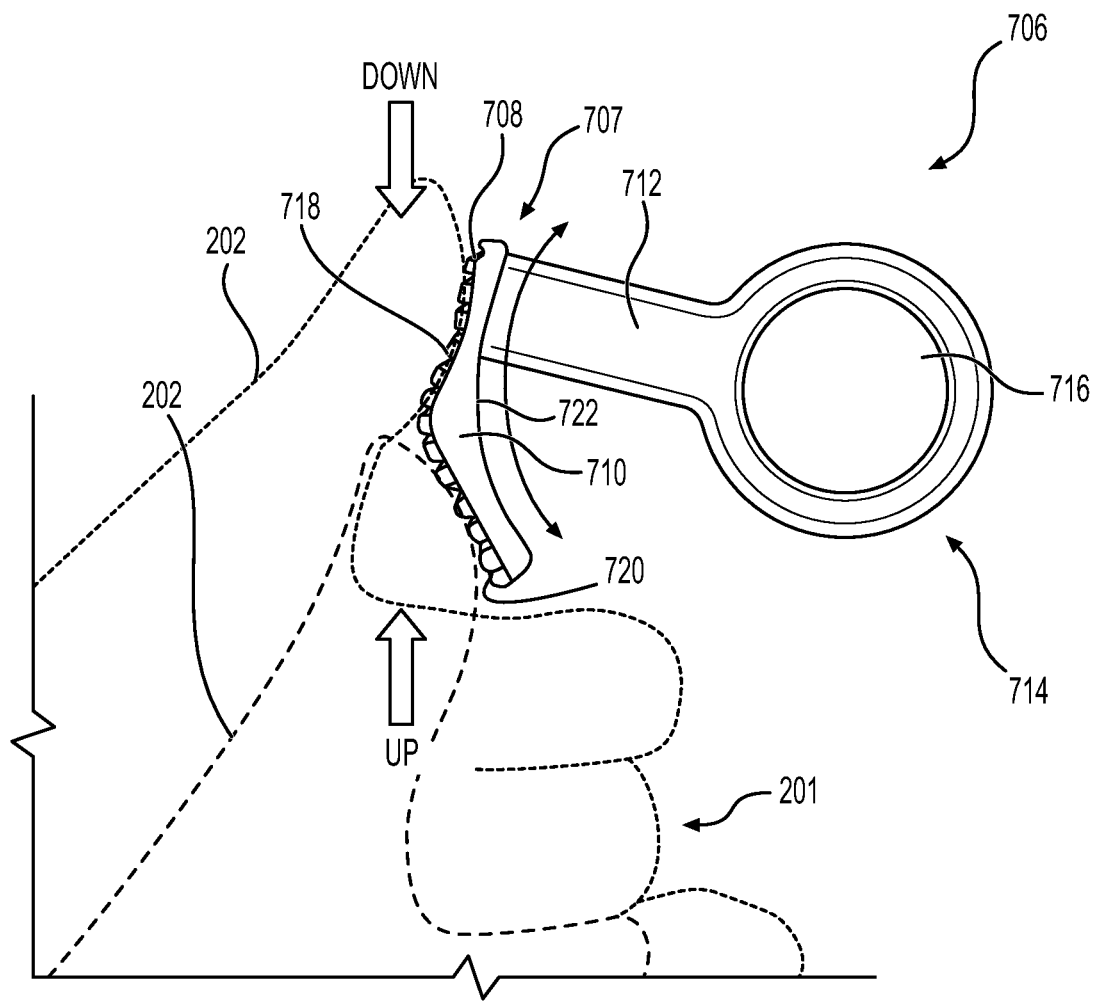

FIGS. 8A-8B show perspective views of an exemplary elevator actuator 706, which may include a contact element 707 that extends in a longitudinal direction (the proximal to distal direction). Contact element 707 may include an upper portion 718 that extends inward from a central bump 710. Contact element 707 may include a lower portion 720 that extends inward from and on the opposite side of central bump 710. An outer contact surface of upper portion 718 is angled relative to an outer contact surface of lower portion 720. Each of the outer contact surface of upper portion 718 and the outer contact surface of lower portion 720 may curve inward, so that the surfaces are concave to provide thumb support and improved thumb contact. An inner surface 722 of contact element 707 may curve inward, also presenting a concave surface. The outer surfaces of central bump 710, upper portion 718, and lower portion 720 may include rubber grip projections 708, protruding from adjacent portions of those outer surfaces, to improve gripping capabilities and comfort. In some examples, elevator actuator 706 may be made of a natural rubber and/or synthetic rubber materials.

Contact element 707 may be coupled to a ring 714 by a connector 712. Connecter 712 may connect to inner surface 722 of upper portion 718, on or near an edge of upper portion 718. Ring 714 may include an opening 716 that aligns with features of handle assembly 106 of endoscope 101. Ring 714 and opening 716 may have the same or similar structure, positioning, and function as ring 520 and opening 522.

In one example, user's thumb 202 may push against lower portion 720 in an upward direction (shown in FIG. 8B) to move elevator actuator 706 up. In one example, user's thumb 202 may push against upper portion 718 in a downward direction (shown in FIG. 8B) to move elevator actuator 706 down. In one example, central bump 710 may act as a stopper and prevent user's thumb 202 from slipping from upper portion 720 to lower portion 718 and vice versa.

It will be apparent to those skilled in the art that various modifications and variations may be made in the disclosed devices and methods without departing from the scope of the disclosure. Other aspects of the disclosure will be apparent to those skilled in the art from consideration of the specification and practice of the features disclosed herein. It is intended that the specification and embodiments be considered as exemplary only.

What is claimed is:

1. A medical device comprising:
   a handle body;
   a flexible shaft coupled to a distal end of the handle body;
   a distal tip coupled to a distal end of the shaft and including a movable element; and
   an actuator coupled to the handle body and configured, upon actuation, to move the movable element, wherein the actuator includes a first contact element having outer contact surfaces each configured for contact by a finger of a user,
   wherein the outer contact surfaces include a center contact surface, a proximal contact surface proximal to the center contact surface, and a distal contact surface distal to the center contact surface, wherein the center contact surface protrudes radially outward relative to the proximal contact surface and the distal contact surface, and further wherein a first end of the center contact surface overhangs the proximal contact surface to define a first gap between the center contact surface and the proximal contact surface, and a second end of the center contact surface overhangs the distal contact surface to define a second gap between the center contact surface and the distal contact surface.

2. The medical device of claim 1, wherein each outer contact surface includes linear protrusions extending transverse to a proximal to distal axis of the medical device.

3. The medical device of claim 1, wherein the proximal contact surface is angled relative to the center contact surface and inwards towards the handle body, the distal contact surface is angled relative to the center contact surface and inwards towards the handle body.

4. The medical device of claim 1, wherein the actuator further includes a connector having a first end coupled to a radially inner surface of the first contact element of the actuator and a second end coupled to a ring.

5. The medical device of claim 4, wherein the ring couples the actuator to the handle body and defines a central aperture that surrounds a structure of the medical device for articulating a distal end of the medical device.

6. The medical device of claim 5, wherein the ring rotates about the structure for to move the movable element.

7. The medical device of claim 5, wherein the actuator includes a second connector having a first end coupled to a radially inner surface of a second contact element of the actuator and a second end coupled to the ring at a position on the ring opposite to a position that the first connector is coupled to the ring.

8. The medical device of claim 7, wherein the first contact element and the second contact element are positioned relative to the handle body so that a user contacting the first contact element with a thumb of a hand may contact the second contacting element with another finger of the hand.

9. The medical device of claim 8, wherein one of pushing up and pushing down on the first contact element while simultaneously the other of pushing up and pushing down on the second contact element rotates the actuator about the handle body.

10. The medical device of claim 7, wherein the second contact element includes a proximal portion and a distal portion, wherein the proximal portion protrudes radially outward relative to the distal portion.

11. The medical device of claim 10, wherein the each of the proximal portion and the distal portion of the second contact element includes a radially outer contact surface that is convex, and each of the proximal contact surface, the distal contact surface, and the center contact surface of the first contact element is convex.

12. The medical device of claim 1, wherein each of the proximal contact surface and the distal contact surface of the first contact element is concave.

13. The medical device of claim 1, wherein the movable element is an elevator configured to pivot about a portion of the distal tip and deliver a tool out of the distal tip at a plurality of angles relative to the distal tip.

14. A medical device comprising:
    a handle body;
    a flexible shaft coupled to a distal end of the handle body;
    a distal tip coupled to a distal end of the shaft and including an elevator configured to pivot about a portion of the distal tip and deliver a tool out of the distal tip at a plurality of angles relative to the distal tip; and
    an actuator coupled to the handle body and configured, upon actuation, to pivot the elevator, wherein the actuator extends radially outward from the handle body and comprises:
      a contact element extending longitudinally in the proximal-to-distal direction, wherein the contact element includes a proximal contact surface, a distal contact surface, and a central contact surface between the proximal and distal contact surface and protruding radially outward relative to the proximal and distal contact surfaces, wherein a first end of the central contact surface overhangs the proximal contact surface to define a first gap between the central contact surface and the proximal contact surface, and a second end of the central contact surface overhangs the distal contact surface to define a second gap between the central contact surface and the distal contact surface; and
      a connector having a first end coupled to an inner surface of the contact element and a second end coupled to a ring, the ring having an aperture surrounding structure for articulating a distal end of the flexible shaft.

15. The medical device of claim 14, wherein each of the proximal contact surface, the distal contact surface, and the central contact surface includes linear protrusions extending transverse to a proximal to distal axis of the medical device.

16. The medical device of claim 14, wherein the actuator includes a second connector having a first end coupled to an inner surface of a second contact element and a second end coupled to the ring opposite to a position that the first connector is coupled to the ring.

17. A medical device comprising:
- a handle body;
- a flexible shaft coupled to a distal end of the handle body;
- a distal tip coupled to a distal end of the shaft and including an elevator configured to pivot about a portion of the distal tip and deliver a tool out of the distal tip at a plurality of angles relative to the distal tip; and
- an actuator coupled to the handle body and configured, upon actuation, to pivot the elevator, wherein the actuator comprises:
  - a first contact element extending radially outward from the handle body comprising:
    - a center portion;
    - a top ridge angled and recessed relative to the center portion; and
    - a bottom ridge angled and recessed relative to the center portion, wherein each of the top ridge and bottom ridge is convex;
  - a first connector having a first end coupled to a radially inner surface of the first contact element and a second end coupled to a ring;
  - a second contact element having a proximal portion and a distal portion, wherein each of the proximal portion and distal portion includes a radially outer contact surface that is convex; and
  - a second connector having a first end coupled to a radially inner surface of a second contact element and a second end coupled to the ring at a position on the ring opposite to a position that the first connector is coupled to the ring.

18. The medical device of claim 17, wherein the top ridge is inwards towards the handle body relative to the center contact portion, and wherein the distal contact surface bottom ridge is angled relative to the center contact surface and inwards towards the handle body relative to the center contact portion.

* * * * *